United States Patent
Salter et al.

(10) Patent No.: US 10,080,257 B2
(45) Date of Patent: Sep. 18, 2018

(54) WINDSHIELD DEICER POWER CONSERVATION SYSTEM

(71) Applicant: FORD GLOBAL TECHNOLOGIES, LLC, Dearborn, MI (US)

(72) Inventors: Stuart C. Salter, White Lake, MI (US); James J. Surman, Clinton Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 509 days.

(21) Appl. No.: 14/823,162

(22) Filed: Aug. 11, 2015

(65) Prior Publication Data
US 2017/0043747 A1   Feb. 16, 2017

(51) Int. Cl.
*H04L 12/403* (2006.01)
*H04L 12/44* (2006.01)
(Continued)

(52) U.S. Cl.
CPC ........... *H05B 1/0236* (2013.01); *B60K 35/00* (2013.01); *B60S 1/026* (2013.01); *B60S 1/048* (2013.01);
(Continued)

(58) Field of Classification Search
None
See application file for complete search history.

(56) References Cited

U.S. PATENT DOCUMENTS 5,010,289 A * 4/1991 Takada .................... B60S 1/026
                                                       15/250.001
5,305,011 A * 4/1994 Furuya .................... B60K 35/00
                                                       340/980
(Continued)

FOREIGN PATENT DOCUMENTS

CN    202686304 U    1/2013
CN    103507642 A    1/2014
(Continued)

OTHER PUBLICATIONS

JP 2006 335115 A, Dec. 2006, Mizuma et al, "Snow Melting Heater for Automobile," partial translation.*

*Primary Examiner* — Joseph M Pelham
(74) *Attorney, Agent, or Firm* — Vichit Chea; MacMillan, Sobanski & Todd, LLC

(57) ABSTRACT

Vehicle apparatus includes a glass windshield and a wiper system. A wiper blade has a parking region on the windshield. A deicer selectably provides heat to the parking region. A windshield temperature sensor detects a temperature of the windshield at the parking region. A head-up display is mounted proximate the windshield to display a temperature indicator responsive to the detected temperature. An automatic control circuit is configured to automatically deactivate the deicer when detecting a deiced condition in response to the detected temperature. A manual control element is configured to manually activate and deactivate the deicer. Thus, excessive heating can be avoided based on feedback of the windshield temperature. In addition, the (Continued)

driver is reminded that the deicer is active in a way that simultaneously provides information enabling the driver to independently evaluate the vehicle conditions and to make informed decisions about when to intervene in the automatic operation.

16 Claims, 4 Drawing Sheets

(51) Int. Cl.
    *B60J 1/20*              (2006.01)
    *B60S 1/02*              (2006.01)
    *B60S 1/04*              (2006.01)
    *B60K 35/00*           (2006.01)
    *H05B 1/02*              (2006.01)
    *H05B 3/84*              (2006.01)

(52) U.S. Cl.
    CPC .................. *H05B 3/84* (2013.01); *B60S 1/04* (2013.01); *H05B 2203/031* (2013.01)

(56) References Cited

U.S. PATENT DOCUMENTS

| | | | |
|---|---|---|---|
| 5,386,098 A * | 1/1995 | Knudsen | B32B 17/10036 219/203 |
| 5,496,989 A * | 3/1996 | Bradford | B60S 1/026 219/482 |
| 5,555,502 A * | 9/1996 | Opel | B60H 1/00985 701/36 |
| 5,873,256 A * | 2/1999 | Denniston | B60H 1/00414 62/244 |
| 5,932,983 A | 8/1999 | Maue et al. | |
| 6,364,010 B1 * | 4/2002 | Richman | B60S 1/487 123/557 |
| 6,369,358 B1 * | 4/2002 | Blessing | B60S 1/048 219/203 |
| 6,668,917 B1 | 12/2003 | Zeng | |
| 7,783,400 B1 | 8/2010 | Zimler | |
| 7,918,100 B2 | 4/2011 | Breed et al. | |
| 8,921,739 B2 * | 12/2014 | Petrenko | H05B 3/84 219/203 |
| 9,045,043 B2 | 6/2015 | Hoke et al. | |
| 9,758,129 B2 * | 9/2017 | Crombez | B60S 1/0818 |
| 2003/0169522 A1 * | 9/2003 | Schofield | B60R 1/04 359/876 |
| 2005/0273218 A1 * | 12/2005 | Breed | B60C 11/24 701/2 |
| 2006/0086715 A1 * | 4/2006 | Briggs | B32B 17/10174 219/488 |
| 2007/0057781 A1 * | 3/2007 | Breed | B60K 35/00 340/457.1 |
| 2007/0089258 A1 * | 4/2007 | Wick | B60S 1/3805 15/250.06 |
| 2007/0194735 A1 * | 8/2007 | Gao | B60H 1/00642 318/443 |
| 2008/0028697 A1 | 2/2008 | Li et al. | |
| 2009/0109011 A1 * | 4/2009 | Lee Kuo | B60C 23/0401 340/441 |
| 2012/0099170 A1 * | 4/2012 | Shikii | G02B 27/01 359/3 |
| 2015/0105976 A1 * | 4/2015 | Shikii | G06F 3/0488 701/36 |
| 2016/0363766 A1 * | 12/2016 | Schmitz | B60H 1/00785 |
| 2016/0375828 A1 * | 12/2016 | Yun | B60S 1/54 701/48 |
| 2017/0113654 A1 * | 4/2017 | Crombez | B60S 1/0818 |
| 2018/0001872 A1 * | 1/2018 | Dudar | H02P 1/18 |
| 2018/0014362 A1 * | 1/2018 | Bulgajewski | H05B 3/86 |

FOREIGN PATENT DOCUMENTS

| | | | |
|---|---|---|---|
| DE | 19709166 A1 * | 9/1998 | .............. B60S 1/026 |
| JP | 2004210156 A | 7/2004 | |
| JP | 2006335115 A | 12/2006 | |

* cited by examiner

WINDSHIELD DEICER POWER CONSERVATION SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to deicing of windshields of road vehicles, and, more specifically, to reduction of energy use in connection with heating the windshield at the park position of a wiper blade.

To improve the performance of windshield wiper blades in cold or freezing weather, a wiper deicer has become a desirable feature. In particular, such a deicer may provide heating to the windshield and to the wiper blades (which may be parked at a wiper park position at a lower edge of the windshield). The applied heat can reduce or eliminate ice and snow buildup on a wiper blade that impairs performance or that necessitates manual cleaning of a wiper blade by a driver.

While a wiper deicer can be activated manually, it may be particularly beneficial in connection with the remote starting of a vehicle so that the vehicle is in a ready state when the driver enters the vehicle. A typical deicer system will automatically turn off after a predetermined time. Although a manual switch is provided for deactivating the deicer, a user may inadvertently forget to turn the system off after sufficient warming has occurred. Automatic turn-on times are typically chosen to keep the deicer activated long enough to complete deicing under the majority of freezing conditions to be expected.

A commonly used source of heat is an electrical resistance heating layer incorporated into or applied onto the windshield and driven by the vehicle electrical system. Heat can also be obtained via a hot air (i.e., defrost) outlet from a cabin HVAC system. Depending on the type of vehicle, the HVAC heat can be derived from an electrical resistance (positive temperature coefficient) heater or as waste heat from an internal combustion engine. In any case, the deicer can consume significant amounts of battery charge.

Automatic deactivation of the deicer after a predetermined amount of time fails to adapt the deicing function to the actual conditions. Thus, known systems may result in excessive battery discharge if left on too long or may result in insufficient deicing if turned off too soon. In electric or hybrid-electric vehicles, any excess battery drain becomes especially problematic since the electric driving range of the vehicle may be reduced.

SUMMARY OF THE INVENTION

In one aspect of the invention, a vehicle apparatus comprises a glass windshield and a wiper system including a wiper blade having a parking region on the windshield. A deicer selectably provides heat to the parking region. A windshield temperature sensor detects a temperature of the windshield at the parking region. A head-up display is mounted proximate the windshield to display a temperature indicator responsive to the detected windshield temperature. An automatic control circuit is configured to automatically deactivate the deicer when detecting a deiced condition in response to the detected windshield temperature. A manual control element is configured to manually activate and deactivate the deicer. Thus, excessive heating can be avoided based on feedback of the windshield temperature. In addition, the driver is reminded that the deicer is active in a way that simultaneously provides information enabling the driver to independently evaluate the vehicle conditions and to make informed decisions about when to intervene in the automatic operation.

DETAILED DESCRIPTION OF PREFERRED EMBODIMENTS

Figure 1:
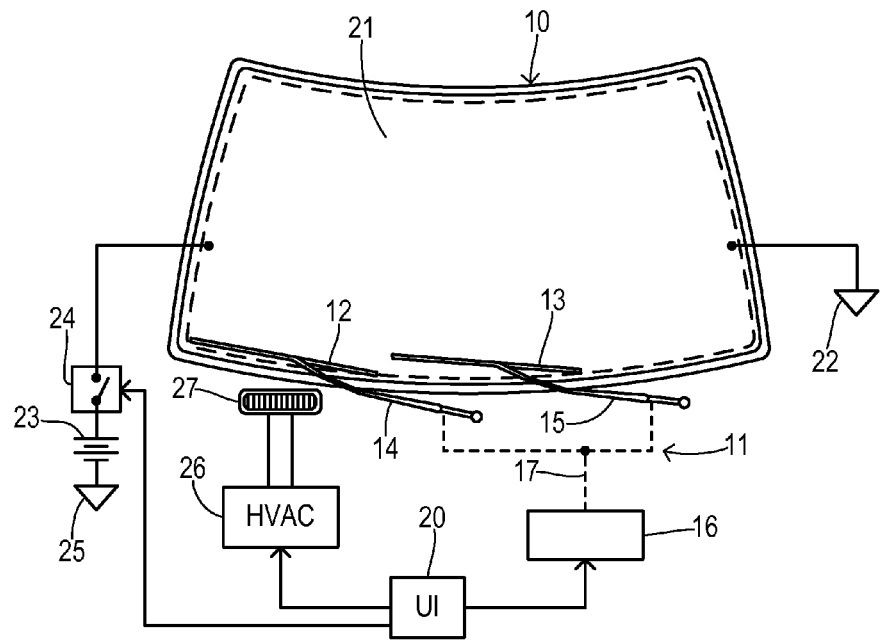
FIG. 1 shows a windshield with a wiper system and windshield heating by a glass-mounted heater and by a warm air flow from an HVAC system.

Referring now to FIG. 1, a glass windshield 10 has an associated wiper system 11 which includes wiper blades 12 and 13 on wiper arms 14 and 15 linked to a wiper motor 16 by a linkage 17. Wiper motor 16 may respond to a user interface 20 for activating the wiper system (e.g., in intermittent or continuous modes).

Windshield 10 can be heated in one or more ways. For example, a resistive heating layer 21 is incorporated in windshield 10 as known in the art. Layer 21 is transparent and can extend over the entire windshield surface as shown or can alternatively cover only a lower portion of windshield 10 to provide heating at a wiper parking region. One end of layer 21 is connected to an electrical ground 22 and an opposite end is connected to a battery 23 via a controllable switch 24. Battery 23 is likewise connected to a ground 25. Switch 24 has a control input which is coupled to user interface 24 so that battery power can be selectably coupled from battery 23 to resistive heating layer 21. User interface 20 may include stalk mounted switches and/or dash panel switches as known in the art.

Figure 2:
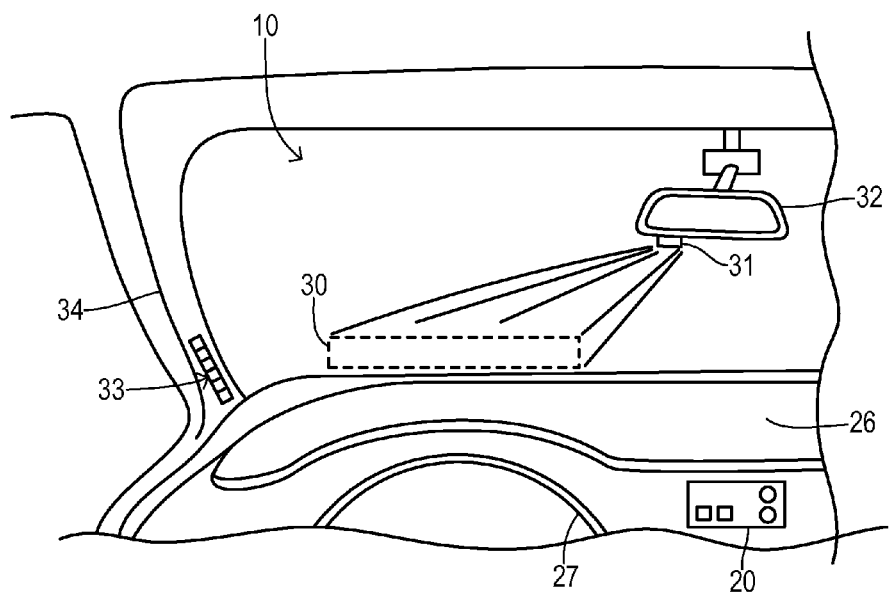
FIG. 2 is an interior view within a vehicle passenger cabin including a windshield and a remote temperature sensor mounted in a rearview mirror.

As shown in FIG. 2, user interface 20 may be located on a front face of an instrument panel 26 in the vicinity of a steering wheel 27. A wiper parking region 30 at a lower edge of windshield 10 is monitored by a remote temperature sensor 31. Sensor 31 can be mounted on a rearview mirror 32, for example. Sensor 31 is preferably comprised of an infrared sensor arranged to have a field of view coincident with parking region 30. One example of an infrared remote sensing device is the MLX90614 infra red thermometer available from Melexis Microelectronic Integrated Systems in Novi, Mich.

Temperature sensor 31 may be connected by a wiring harness to a control circuit (not shown) via rearview mirror 32. The control circuit may comprise a microcontroller or other processor which may be integrated with user interface 20 or may be located in another electronic module within the vehicle. A head-up display 33 is located proximate windshield 10 to display a temperature indicator for easy viewing by the driver at a position close to wiper parking region 30 to establish an intuitive relationship between the display and the controlled function. The indicator is generated in response to the detected windshield temperature from sensor 31, and the magnitude of the temperature can be represented using text, a color mapping, light intensity or brightness, a flashing icon with a variable blinking rate, a partially-illuminated bar (similar to a progress bar), or other visual features. As shown in FIG. 2, head-up display 33 may be incorporated into a vehicle's A-pillar along an edge of windshield 10. Display 33 may preferably be comprised of a multicolor LED, an array of LEDs, an LCD panel or other display technologies.

Figure 3:
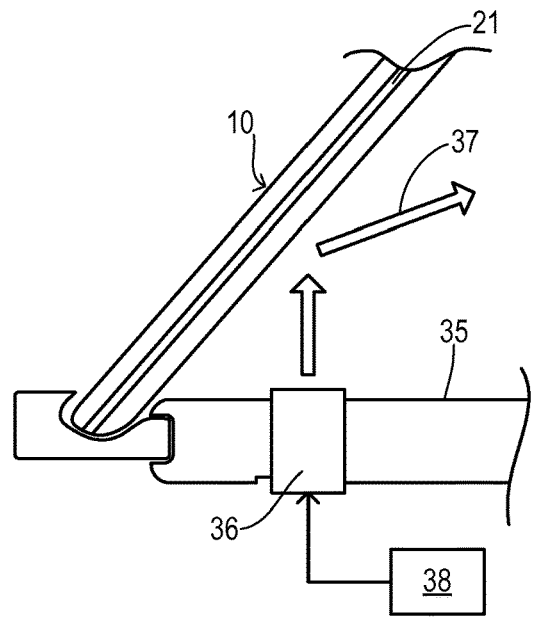
FIG. 3 is a side view showing the placement of one type of head-up display in proximity to the windshield.

As shown in FIG. 3, a head-up display based on reflection by the windshield of an indicator generated by a light projector can be used. Thus, a light projector 36 mounted to instrument panel cover 33 projects a temperature indicator (and/or indicators for other parameters) onto windshield 10 which may be reflected toward the driver as shown at 37. Preferably, light projector 36 and windshield 10 are oriented such that the apparent location for the temperature indicator as seen by the driver overlaps or adjoins with the wiper parking region. Light projector 36 may be comprised of a multicolor LED for representing hotter temperatures with shades of red and colder temperatures with shades of blue, as commanded by a controller 38.

Figure 4:
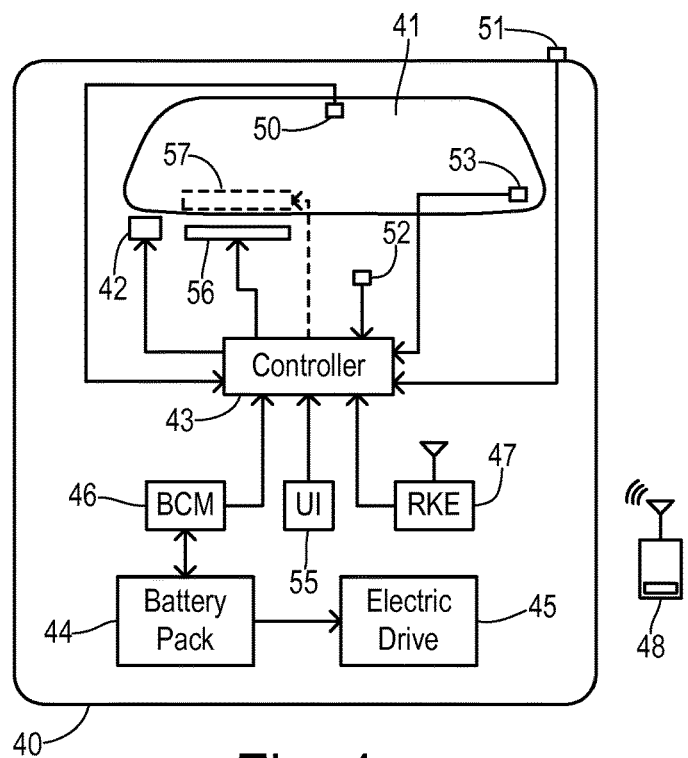
FIG. 4 is a block diagram of an electric vehicle with a deicer system according to one embodiment of the invention.

FIG. 4 shows a vehicle 40 having a windshield 41 with a wiper park deicer 42 to selectively provide heat to a wiper parking region under control of a controller 43. Controller 43 may include a discrete control circuit, a programmable gate array, or a general-purpose microcontroller, for example. Vehicle 40 is shown as an electric vehicle including a battery pack 44 and an electric drive 45. A battery control module (BCM) 46 is used in conjunction with battery pack 44 as known in the art. BCM 46 is coupled with controller 43 for providing data relating to a charge level of the battery pack to allow the battery charge to be displayed to the driver. Thus, the driver can consider the impact on battery charge when choosing to activate or deactivate the deicer.

A remote keyless entry (RKE) module 47 communicates with a remote transmitter 48 permitting a driver to initiate a remote start of vehicle 40 as known in the art. In the case of an electric vehicle, a "remote start" may include an initiation of heating or cooling of the passenger cabin and activation of the windshield wiper deicer before the driver enters the vehicle. Thus, RKE module 47 is coupled with controller 43 to initiate deicer operation when a remote start event occurs.

Controller 43 is coupled to a plurality of sensors for determining an iced-up or a deiced (i.e., ice-free) condition of the windshield wiper parking region. The sensors include windshield temperature sensor 50, an outside ambient air temperature sensor 51, an inside ambient air temperature sensor 52, and a sunload sensor 53. Windshield temperature sensor 50 is preferably comprised of an infrared temperature sensor for monitoring the wiper parking region as described above. In response to the various sensor inputs, controller 43 uses a pre-programmed model to determine the most likely iced/deiced state of the windshield glass. Using the determined condition, controller 43 may be further configured to provide automatic control of deicer activation and deactivation.

The present invention additionally provides for manual intervention via a user interface 55 and head-up display 56. User interface 55 includes one or more manual control elements configured to manually activate and/or deactivate the deicer heating function. Head-up display 56 is located proximate (i.e., directly upon, next to, or visible by reflection from) windshield 41 in order to display a temperature indicator responsive to detected windshield temperature as described above. Head-up display 56 may include a light projector/generator installed to the side of windshield 41 or may alternatively include light generating elements applied directly to windshield 41 such as a printed LED film 57 which would likewise be controlled by controller 43.

Controller 43 may preferably implement an empirically-based model for determining whether freezing conditions exists at windshield 41 which can be inferred using the various sensed temperatures, sunload, and other factors. A model which estimates heat flow within the air, glass, and surrounding materials to predict whether a deiced condition would be present can be easily derived using known methods.

In addition to or instead of the temperature based model, the presence of ice on the wiper blade or windshield (or even a blade that is frozen in place at the parking region) can be determined based on an electrical response of the wiper system. For example, a current drawn by the wiper motor under normal, deiced conditions (e.g., a current waveform) could be characterized in advance. By energizing the wiper motor and then monitoring an actual current, the normal deiced condition could be detected based on how well the actual current matches the predetermined current.

In a simplified alternative embodiment, the additional temperature/sunload sensing and the processing for predicting the deiced condition could be avoided. Controller 43 could provide automatic deactivation based only upon a predetermined "on-time" or delay for energizing the deicer. In such an embodiment, the driver can still obtain increased efficiency based on the head-up display showing the windshield temperature 1) as a reminder that the deicer is active, and 20 as a source of data that is helpful in determining when the deicer can be deactivated.

Figure 5:
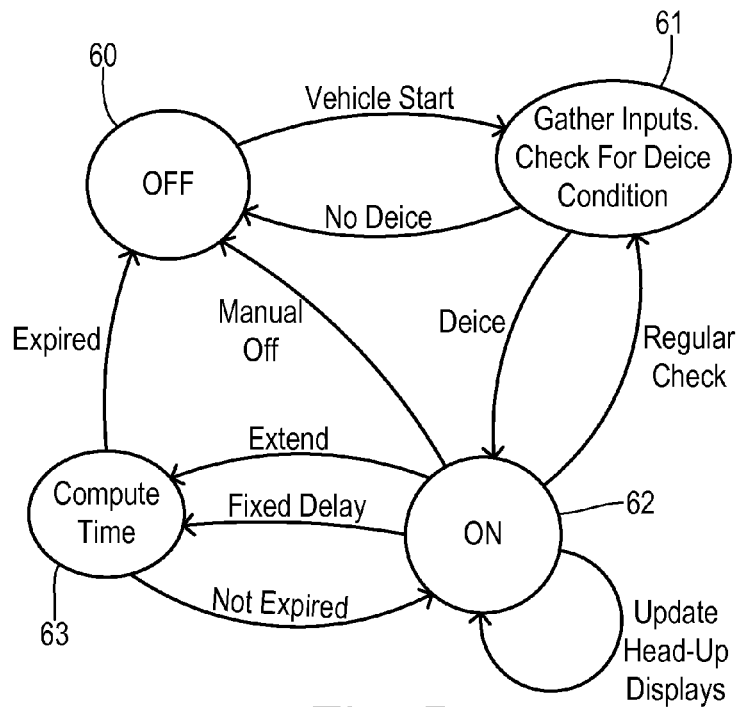
FIG. 5 is a state diagram for a deicer control according to a preferred embodiment of the invention.

FIG. 5 shows one preferred embodiment of a state diagram for a deicer system of the invention. In an initial state 60, the deicer is deactivated. In response to a start signal (e.g., starting of the vehicle via a remote fob or an in-vehicle start switch), the system control circuit transitions to a state 61 wherein measured inputs (e.g., temperatures and sunload) are gathered, and the controller performs a check for detecting a deiced condition. If a deiced (i.e., ice-free) condition is detected, then a transition is made back to state 60 and the deicer remains deactivated. If a deiced condition does not exist (i.e., a certain probability of freezing exists), then a transition is made to On state 62, whereupon the deicer is activated. While in On state 62, periodic re-checks for the deiced condition may be performed by transitioning back to state 61. Thus, the deicer will turn off (i.e., deactivate) once the deiced condition is reached. While in state 62, the head-up display(s) are continuously updated in order to inform the driver of the windshield temperature and/or other parameters such as battery charge level and an amount of time remaining until an automatic deactivation of the deicer is scheduled to occur. While in On state 62, a manual off event can be initiated by the driver using a manual control element, which causes a transition back to Off state 60.

When entering On state 62, a predetermined on-time may be loaded into a countdown timer that deactivates the deicer upon expiration of the on-time. Decrementing of the timer occurs in response to periodically-timed transitions made from On state 62 to a Compute Time state 63 which adjusts the remaining time (e.g., by decrementing the contents of the timer). If the timer has not yet expired (i.e., not yet decremented to zero), then a return is made to On state 62. A different adjustment of the remaining time would occur in response to a corresponding manual activation of a manual control element by the driver while in On state 62. In other words, a transition is made from On state 62 to Compute Time state 63 where the contents of the countdown timer are increased by a predetermined amount in order to extend the time remaining before an automatic deactivation. Thus, the driver may have been informed by the head-up display of an imminent automatic deactivation, and the driver responds by pressing the control element for extending activation of the deicer based on visible icing-up of the wiper blade, for example. If decrementing the timer in state 63 results in a zero (i.e., the timer expires), a transition is made to Off state 60 and the deicer is deactivated.

Figure 6:
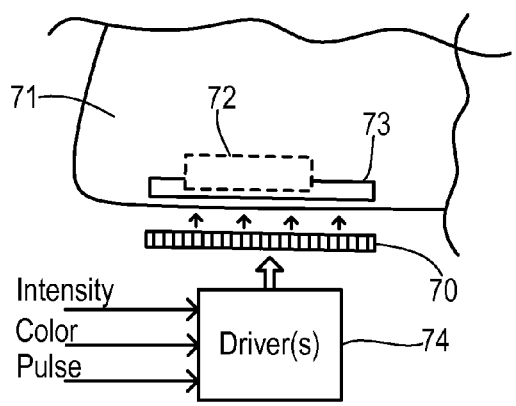
FIG. 6 shows one embodiment with a head-up display providing a visible indicator that overlaps with a wiper parking region.
Figure 7:
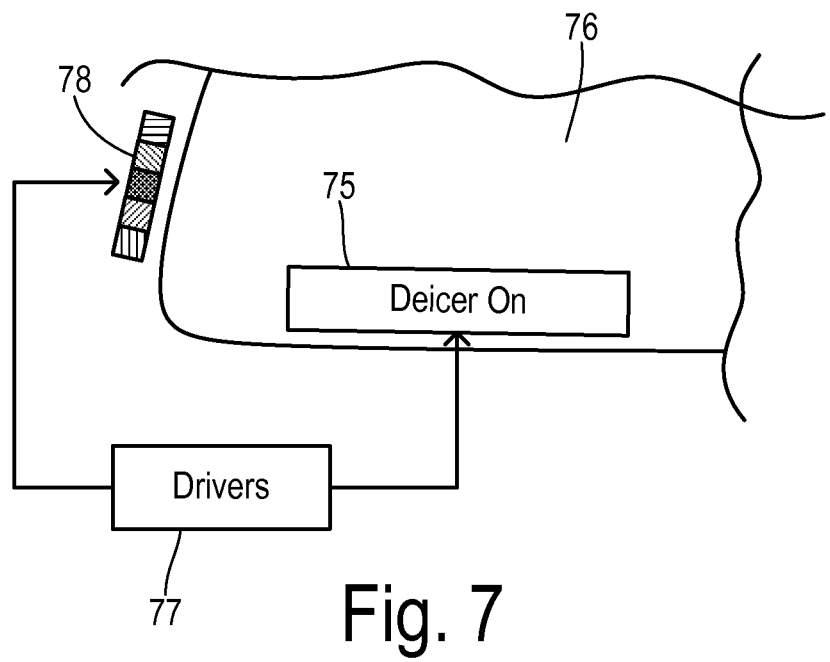
FIG. 7 shows additional display options including a text display and a display indicator installed along a vertical side of the windshield.
Figure 8:
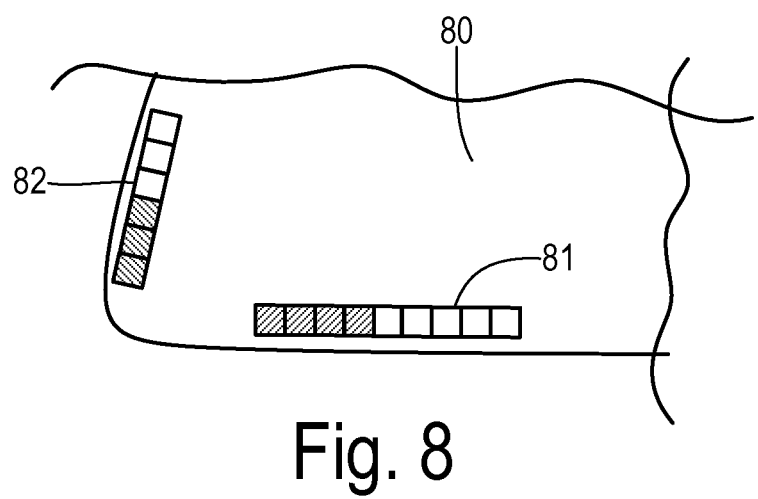
FIG. 8 shows one preferred embodiment with head-up indicators for windshield temperature and battery charge.

FIGS. 6-8 provide specific examples for a head-up display. In FIG. 6, a light projector 70 (such as an array of colored LED elements with projection lenses if needed) is arranged at a periphery of a windshield 71. The wiper parking region 72 on windshield 71 is heated by a deicer (not shown). Light projected from projector 70 onto windshield 71 is reflected toward the driver with an apparent position 73 overlapping or adjoining wiper park region 72. A driver circuit 74 coupled to LED array 70 receives corresponding control signals for varying a color, brightness (intensity), and/or flashing at a commanded pulse repetition rate. The control signals implement a chosen schema that communicates to the driver the windshield temperature data. For example, a temperature below freezing may be represented by blue (e.g., with different shades of blue for different temperature ranges) and a temperature above freezing represented by a red light (e.g., with different shades of red for different temperature ranges). As a timed activation of the deicer approaches expiration, a pulse repetition rate for the temperature data can be increased to signal the driver of the impending deactivation.

As shown in FIG. 7, and on-window head-up display 75 on a windshield 76 may include a text display for indicating the deicer status. A text display can be implemented using a printed LED film, for example. A driver circuit 77 responds to a controller (not shown) for configuring the display. The head-up display may further include an LED array 78 which is located proximate to windshield 76 by installing it along an edge of windshield 76. An array of LEDs may be arranged in a lineal pattern with a variable number of LEDs being illuminated beginning at one end in order to indicate the desired information. Thus, the length of an illuminated bar and/or the color(s) shown along the bar can be used to convey temperature and or time information. Poor battery charge information.

In yet another embodiment as shown in FIG. 8, a windshield 80 may include a plurality of individual head-up displays 81 and 82 projected on windshield 80 to provide a coordinated representation to the driver for windshield temperature, battery charge, or other relevant information.

As shown by the foregoing description, a head-up display can be constructed with various different display technologies such as printed LED films, LED projectors, and discrete LEDs or text displays. Display indicators can use text, color, flashing, and other changes of intensity to convey temperature and other data. The invention provides an improved deicer performance and a reduced energy consumption by employing an infrared sensor to monitor glass temperature at the windshield wiper park area before, during, and after heating by the deicer. The measured glass temperature is used to generate a driver information display and/or to use in an algorithm for inferring a deiced condition and automatically controlling deicer turn on/turn off. The preferred embodiment provides a coordination of automatic and manual methods that ensures deicer power consumption occurs only when needed. The use of an intuitive indicator in a convenient viewing location reduces the amount of the driver's attention required. The invention provides an effective reminder of system status, remaining activation time, and temperature of the windshield. The head-up display indicators can be configured to provide light over a large area while allowing the driver to see through the indicator, thereby maintaining attention of the road while obtaining the head-up display information. The small size of the display elements and the unobtrusive locations allow the vehicle manufacturer more styling freedom to create an attractive product. In a preferred embodiment, the automatic control of the deicer is adapted to accept manual overrides and to provide useful information to the driver for making effective activation decisions based on important considerations including wiper performance and electric vehicle driving range.

What is claimed is:
1. Vehicle apparatus comprising:
a glass windshield;
a wiper system including a wiper blade having a parking region on the windshield;
a deicer selectably providing heat to the parking region;
a windshield temperature sensor detecting a temperature of the windshield at the parking region;
a head-up display proximate the windshield displaying a temperature indicator showing a magnitude of the detected windshield temperature;
an automatic control circuit configured to automatically deactivate the deicer; and
a manual control element configured to manually activate and deactivate the deicer.

2. The apparatus of claim 1 wherein the automatic control circuit deactivates the deicer in response to detecting a deiced condition based on the detected windshield temperature.

3. The apparatus of claim 1 wherein the automatic control circuit deactivates the deicer after a predetermined on-time.

4. The apparatus of claim 1 wherein the windshield temperature sensor is comprised of an infrared sensor mounted remotely from the windshield and having a field of view coincident with the parking region.

5. The apparatus of claim 1 wherein the deicer is comprised of a resistive heating layer incorporated with the glass windshield.

6. The apparatus of claim 1 wherein the head-up display is comprised of a light projector that projects the temperature indicator onto the windshield.

7. The apparatus of claim 1 wherein the head-up display is comprised of a plurality of colored LED elements arranged at a periphery of the windshield.

8. The apparatus of claim 1 wherein the temperature indicator has a color determined in response to the detected windshield temperature.

9. The apparatus of claim 1 wherein the control circuit is configured to automatically deactivate the deicer after a predetermined on-time, and wherein the head-up display includes a time indicator responsive to a remaining time until expiration of the predetermined on-time.

10. The apparatus of claim 9 wherein the control circuit is responsive to an activation of the manual control element to extend the predetermined on-time.

11. The apparatus of claim 9 wherein the time indicator includes a pulsing display having a pulse rate that varies in proportion to the time remaining.

12. The apparatus of claim 1 wherein the deicer operates at a plurality of heating intensities, and wherein the head-up display includes an intensity indicator.

13. The apparatus of claim 1 further comprising an electric vehicle drive and a battery providing electrical energy for the electric vehicle drive and the deicer;
wherein the head-up display includes a battery charge indicator.

14. The apparatus of claim 1 wherein the automatic control circuit deactivates the deicer in response to detecting a deiced condition based on the detected windshield temperature, an outside ambient temperature, an inside ambient temperature, and a sunload.

15. The apparatus of claim 14 wherein the automatic control circuit deactivates the deicer in response to detecting a deiced condition based on the detected windshield temperature and an electrical response of the wiper system.

16. A method for a vehicle windshield deicer, comprising:
remotely sensing a windshield temperature;
activating the deicer in response to an iced condition;
projecting a sensed-temperature magnitude proximate the windshield;
automatically deactivating the deicer in response to at least one of a time period or detection of a deiced condition using the sensed temperature; and
extending the time period in response to a manual activation; and
deactivating the deicer in response to a manual deactivation.

* * * * *